Aug. 16, 1932.    C. R. ROGERS    1,872,504
ELECTRICAL GEOLOGICAL DISTURBANCE DETECTOR
Filed April 22, 1929
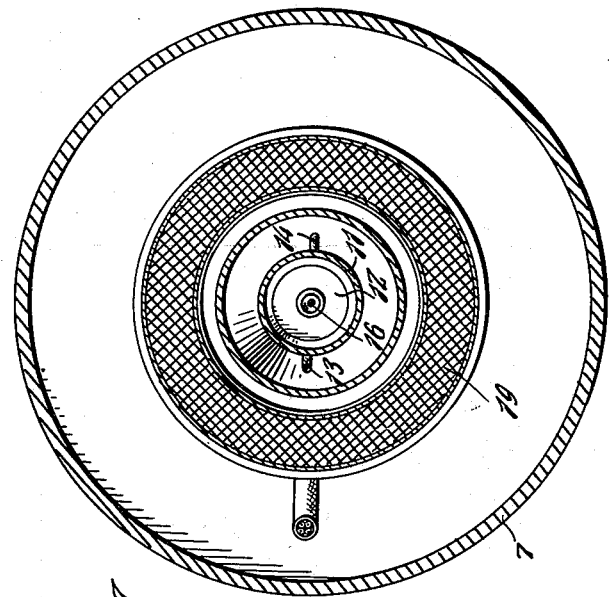
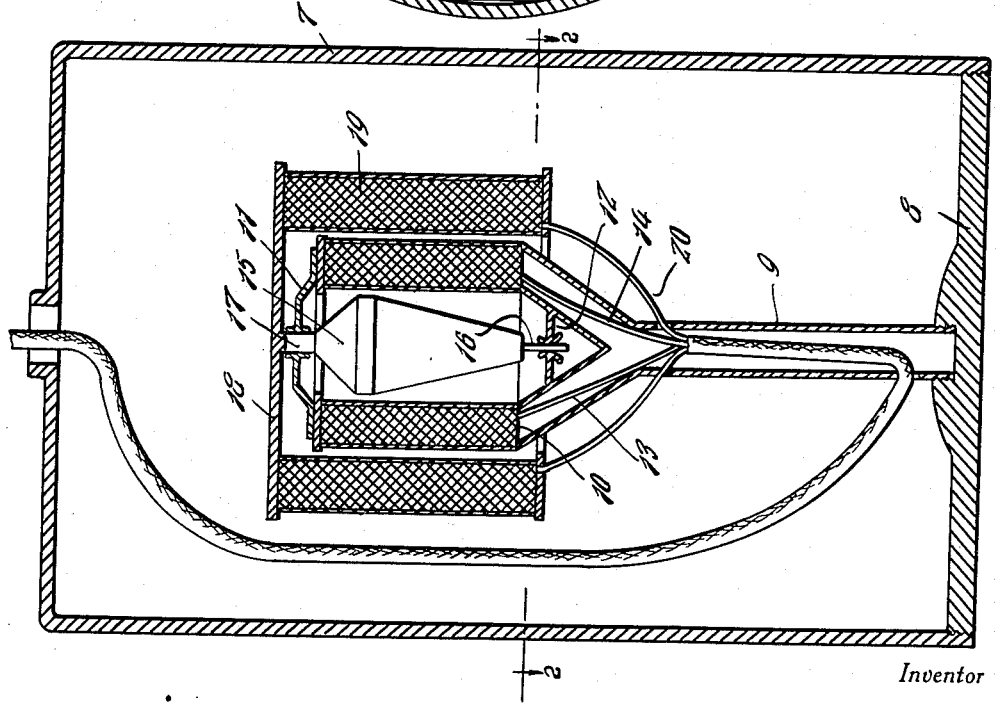
Inventor
*Cullen R. Rogers*
By *Clarence A. O'Brien*
Attorney Patented Aug. 16, 1932

1,872,504

UNITED STATES PATENT OFFICE

CULLEN R. ROGERS, OF GRAHAM, TEXAS

ELECTRICAL GEOLOGICAL DISTURBANCE DETECTOR

Application filed April 22, 1929. Serial No. 357,114.

The present invention relates to improved means for detecting geophysical disturbances and more specifically to vibration detecting means whereby geophysical disturbances may be converted into a corresponding fluctuating current of electricity, which in turn may energize a suitable indicating or recording device.

The principal object of this invention is to provide an instrument for indicating earth disturbances with more accuracy than instruments now in use.

As the following description proceeds, other very important objects and advantages of the invention will readily become apparent.

In the drawings:—

Fig. 1 represents a vertical sectional view through the detector.

Fig. 2 represents a horizontal sectional view taken substantially on the line 2—2 of Fig. 1.

Referring to the drawings wherein like numerals designate like parts, Fig. 1 discloses the detector which includes a cylindrical casing 7 provided with a removable bottom 8 and being substantially water-tight throughout. This casing is adapted to be embedded in the earth and contains the following electrical items. A tubular post 9 of suitable di-electric material of Y-shape is adapted to support a magnetic coil 10 upon the top thereof, substantially as shown in Fig. 1. Guide means 11 and 12 are provided at the upper and lower ends of the coil 10. A suitable source of direct current, not shown, is connected to the coil 10 by means of wires 13 and 14 and serves to energize the coil when the device is in operation.

A core 15 of the required permeability is adapted to be suspended within the coil 10 by the action of the magnetic flux of the coil when the same is energized. The core 15 has a pin 16 extending at one end through the guide 12 while the opposite end thereof is provided with a shank 17 connected to a cross member 18. The shank 17 is slidably disposed through the guide 11. The cross member 18 has a depending coil 19 secured thereto in circumscribing relation to the coil 10 and the conductors 20 extending from the opposite sides thereof, may be connected to any suitable indicating or recording device not shown, such as a galvanometer or recording oscillograph.

It will thus be seen that when the magnetic device 3 is embedded firmly in the earth any new physical disturbances which are usually in waves moving outwardly toward the crust of the earth will correspondingly vibrate the casing 7 and fixed coil 10. The coil 10 will be moved independently of the core 15 which is magnetically suspended within the said coil and this deviation of the coil 10 with respect to the coil 19 will pulsate the current passing from the secondary coil 19 to the indicating device, not shown. This pulsating current may, of course, be suitably amplified in any known manner, if such should be desirable.

It will thus be seen that the detector may be utilized for accurately indicating the intensity and, if connected to a suitable recording device, the duration of geophysical disturbances and it is furthermore submitted that the detector is capable of operation under the most extreme conditions without permanently affecting its efficiency.

Having thus described my invention, what I claim as new is:—

1. A vibration detector comprising a vibratory container, a coil mounted within said container and being movable therewith, a core adapted to be suspended within the coil when said coil is electrically energized, and inductive means movable independently of the said coil and being motivated by said core.

2. A vibration detector comprising a vibratory container, said container being open at its bottom, a plug for disposition within the open bottom of the container, a hollow post mounted upon the plug and within the container, a magnetic coil mounted upon the post, a secondary coil disposed around the first-mentioned coil, a core for disposition within the first-mentioned coil, and a positive connection between the said core and the secondary coil, said hollow post being adapted to receive conductors leading to the said coils.

3. A vibration detector comprising a normally electrically energized coil mounted to be movable in response to mechanical vibrations, a core, means for mounting said core within said coil so that said core will be vertically suspended by the magnetic flux of said coil, and a second coil rigidly supported by said core in inductive relation to said first mentioned coil.

4. A vibration detector comprising a primary coil movable in response to vibrations, a core within said primary coil, said core being relatively movable with respect to said primary coil, a secondary coil circumscribing said primary coil and rigidly secured to said core so as to be movable therewith.

5. A device for detecting earth vibrations comprising a coil mounted to be movable in response to earth vibrations, means for electrically energizing said coil, a core, means for mounting said core within said coil so that it will be flexibly suspended by the magnetic flux of said coil, and means for indicating relative movement between said coil and said core comprising a second coil mounted in inductive and circumscribing relation to said first mentioned coil and connected to said core so as to be movable therewith.

In testimony whereof I affix my signature.

CULLEN R. ROGERS.